(12) United States Patent
Carratura

(10) Patent No.: US 12,738,241 B1
(45) Date of Patent: Sep. 15, 2026

(54) HANDHELD MAGNETIC MESSAGING BOARD FOR OUTDOOR USE

(71) Applicant: Ralph S. Carratura, Allison Park, PA (US)

(72) Inventor: Ralph S. Carratura, Allison Park, PA (US)

( * ) Notice: Subject to any disclaimer, the term of this patent is extended or adjusted under 35 U.S.C. 154(b) by 0 days.

(21) Appl. No.: 19/302,579

(22) Filed: Aug. 18, 2025

Related U.S. Application Data

(60) Provisional application No. 63/688,005, filed on Aug. 28, 2024, provisional application No. 63/685,019, filed on Aug. 20, 2024.

(51) Int. Cl.

| | |
|---|---|
| ***G06F 3/03*** | (2006.01) |
| ***G06F 3/041*** | (2006.01) |
| ***G06F 3/042*** | (2006.01) |
| ***G06F 3/044*** | (2006.01) |
| ***G06F 3/045*** | (2006.01) |
| ***G09G 3/34*** | (2006.01) |

(52) U.S. Cl.
CPC ............... *G09G 3/344* (2013.01); *G06F 3/03* (2013.01); *G06F 3/04166* (2019.05); *G06F 3/042* (2013.01); *G06F 3/044* (2013.01); *G06F 3/045* (2013.01); *G09G 2330/023* (2013.01); *G09G 2354/00* (2013.01); *G09G 2370/16* (2013.01)

(58) Field of Classification Search
CPC ............. G09G 3/344; G09G 2330/023; G09G 2354/00; G09G 2370/16; G06F 3/04166; G06F 3/03; G06F 3/042; G06F 3/044; G06F 3/045
See application file for complete search history.

(56) References Cited

U.S. PATENT DOCUMENTS

| | | | | | |
|---|---|---|---|---|---|
| 4,143,472 | A | * | 3/1979 | Murata | B43L 1/008 434/409 |
| 4,675,476 | A | * | 6/1987 | Kobayashi | G06F 3/046 346/21 |
| 5,820,385 | A | * | 10/1998 | Ohashi | B43L 1/008 434/408 |
| 6,092,294 | A | * | 7/2000 | Mak | B43L 1/008 446/131 |

(Continued)

OTHER PUBLICATIONS https://www.mxpmag.com/kimpex-canada-presents-dialed-in-with-donk-9/?utm_source=chatgpt.com Entire screenshot shows the prior art pit boards and method of use.

(Continued)

*Primary Examiner* — Afroza Chowdhury
(74) *Attorney, Agent, or Firm* — Karen Tang-Wai Sutton

(57) ABSTRACT

An improved handheld outdoor messaging board provided as a magnetic writing panel and display surface housed within a frame assembly. Magnetic docks are formed into the frame assembly to which removable magnetic writing pucks couple. An eraser bar assembly slideably engages a back side of the writing panel. A plurality of accessory slots formed into the frame assembly are adapted as hand grips or accessory module holders. The option accessory module may be disposed as a light, stopwatch, buzzer, extension pole or a variety of wireless communications receivers or readers including RFID devices and GPS devices. A method of use of the improved handheld messaging board during an outdoor motocross race is also provided.

5 Claims, 17 Drawing Sheets

(56) References Cited

U.S. PATENT DOCUMENTS

| | | | | |
|---|---|---|---|---|
| 2010/0253468 | A1* | 10/2010 | Devecka | B43K 23/00 340/3.1 |
| 2011/0187547 | A1* | 8/2011 | Kweon | G01C 21/3697 340/670 |
| 2012/0068832 | A1* | 3/2012 | Feldstein | G06F 1/1632 340/12.5 |
| 2017/0097695 | A1* | 4/2017 | Ribeiro | G06F 3/03545 |
| 2021/0049831 | A1* | 2/2021 | Pollak, III | H04W 4/80 |

OTHER PUBLICATIONS https://www.mxpmag.com/fox-racing-canada-presents-behind-the-lens-pit-boards-and-pit-signs/ Entire screenshot shows the prior art pit boards and method of use.

https://elevatedmx.com/2020/08/03/the-art-of-the-pit-board/ Entire screenshot shows prior art pit boards and method of use.

* cited by examiner

HANDHELD MAGNETIC MESSAGING BOARD FOR OUTDOOR USE

CROSS-REFERENCE TO RELATED APPLICATIONS

This application claims benefit of U.S. provisional patent application Ser. No. 63/688,006 filed on 28 Aug. 2024, and U.S. provisional patent application Ser. No. 63/685,019 filed 20 Aug. 2024 both from which priority and benefit is claimed under all applicable sections of Title 35 of the United States Code including, but not limited to, Sections 120, 121, and 365(c), and which in its entirety is incorporated by reference into this application.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A READ-ONLY OPTICAL DISC, AS A TEXT FILE OR AN XML FILE VIA THE PATENT ELECTRONIC SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of handheld message signs, specifically, an improved erasable board with magnetic writing tools for use outside under all weather conditions, allowing handwritten messages to be created and erased quickly and easily using only the board and its writing tools.

Background Art

Motocross and other outdoor sports use pit boards that are signs upon which a rider's pit crew or support team will write messages for the rider to see as he or she passes by while on the course. These messages include inspirational messages, as well as practical information such as the number of laps or directions to the rider to make a pit stop to refuel, for instance. In the past, pit boards were simply chalk boards and now erasable boards using dry-erase markers are the standard. The messaging boards ideally are designed to allow the pit crew to write customized messages quickly and easily, then erase and write new messages as desired. Both of these types of boards work well under dry weather conditions, but not in high humidity, rain, or dusty conditions. Dry erase markers and boards in particular do not function well in suboptimal outdoor conditions. Dust in particular can easily scratch and ruin the pit board, and the markers do not write on a damp board so are unsuitable for rainy weather. Given the nature of outdoor sporting events, it is difficult to protect the board in suboptimal conditions. While dry erase boards are inexpensive, the custom graphics on the board with the team name, rider number and sponsors are not; custom graphics help the rider identify messages meant specifically for the rider, as well as serve as advertising for sponsors, and thus the need to replace the boards regularly is both inconvenient and expensive over time.

What is needed is an improved messaging board that allows customized messages written on the board using integrated writing tools impervious to outdoor conditions while providing a lightweight and durable handheld messaging sign. What is also needed is an improved messaging board that has replaceable parts to preserve customized graphics around the board while allowing the message display surface of the board to be interchanged with a variety of different display surfaces. What is finally needed is an improved messaging board adapted to integrate useful equipment such as stopwatches and in some cases allow for real time information to be displayed on the board in a useful message format size.

SUMMARY OF THE INVENTION

An improved handheld messaging board for outdoor use, comprising a writing panel disposed in a first embodiment as a container with a flat display surface storing a predetermined quantity of iron particles suspended in a white liquid, the writing panel housed in a frame assembly having a front frame with an opening positioned over the writing panel such that the flat display surface is accessible through the opening, and a back frame covering a back side of the writing panel. The frame assembly is further formed with an eraser slot with an eraser bar assembly slideably engaging the eraser slot such that a magnetic bar of the eraser assembly is immediately adjacent the back side of the writing panel and slideably engages therewith. A writing puck with a handle portion and a puck body with a flat magnet of a predetermined size adapted to slideably engage the display surface is included and is removably and magnetically stored inside a dock formed into the frame assembly, where the handle portion of the writing puck is exposed by a puck notch formed into a front frame of the frame assembly and partially exposing the dock. In some embodiments, the handle of the writing puck is hingeably connected to the puck body whereby the handle can swivel and lie flat against the puck body when inside the dock and pivot at least 90 degrees. The frame assembly is further formed with a first and second accessory slots adapted to receive either a human hand or an accessory module. The accessory modules include stopwatches, lights, extension poles, GPS-based telemetry units, RFID devices, environmental sensors, wireless communication modules for receiving data, buzzers, haptic feedback devices or devices that can receive and display data from one or more GPS-based telemetry units, Bluetooth or RF lap timers, UWB-based corner timing systems, mobile app interfaces, or track-side data transmitters. When the accessory module is an extension pole, the extension pole is coupled to the accessory slot and the handle is adapted to be held by a human hand or within a mounting bracket.

In a first aspect of the invention, the writing panel may be an electronic writing panel with an electronic screen with the magnetic writing panel or substitute the magnetic writing panel for the electronic screen. The electronic screen and writing panel includes a wireless communication receiver communicating with the writing panel, a controller controlling the writing panel and the communication receiver, and a power supply to power the writing panel. The wireless communication receiver and display unit are either part of the accessory module or is a separate module housed within or attached to the frame assembly, or form part of the writing panel or display screen. The communication receiver may be included when the writing panel and display screens are magnetic, electronic, or both magnetic and electronic. The controller determines the order in which received information by the receiver is displayed, for what amount of time and when to stop displaying the received information. When the writing panel is at least in part an electronic writing panel with an electronic screen, it has either a capacitive, resistive, or infrared touch screen.

In a second aspect of the invention, when the writing panel is removably housed inside the frame assembly, the frame assembly, one or more accessory modules, and one or more electronic and magnetic writing panels are available as a kit.

In a third aspect of the invention, a method of using the improved messaging board as an erasable messaging board during a motocross race is included, where the writing panel is a magnetic panel housing a quantity of white liquid and suspended iron particles, comprising the steps of positioning a magnet onto the display surface of the magnetic panel, forming a visual message by sliding the magnet along the display surface, displaying the message to a third party at a distance of more than 6 feet, and erasing the message by sliding a magnetic eraser over the display surface.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
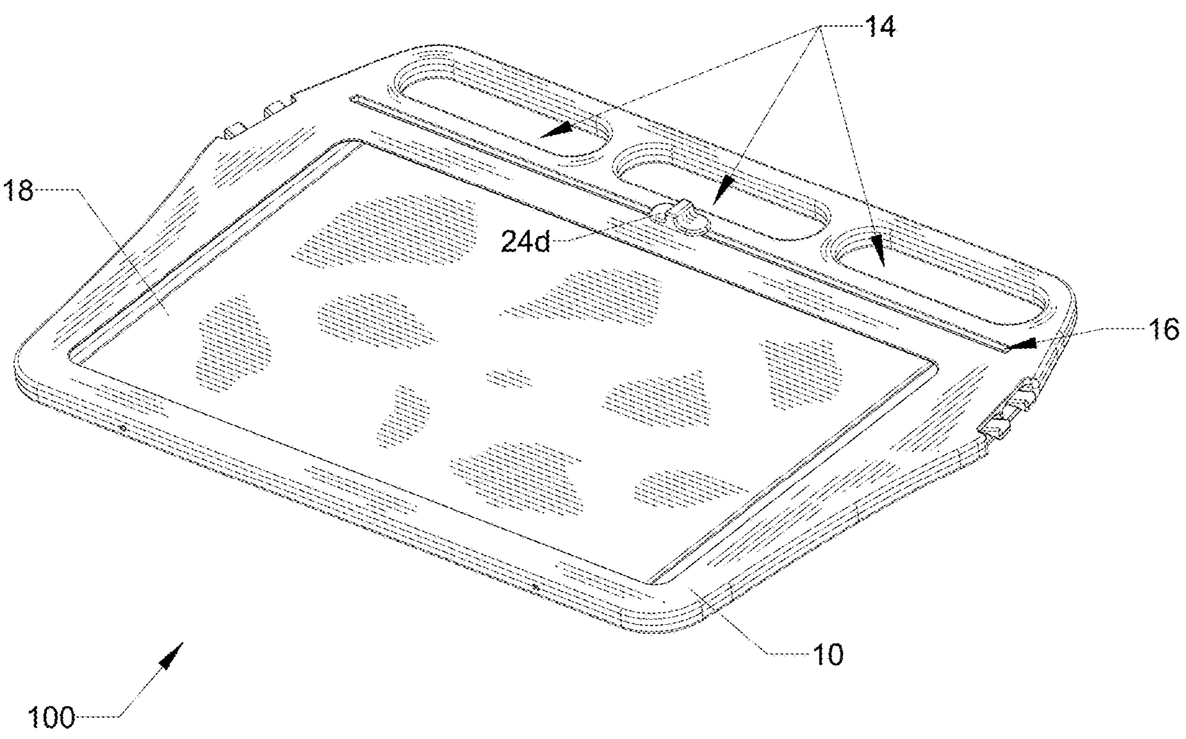
FIG. 1 is a first perspective view of an improved messaging board according to the invention.
Figure 2:
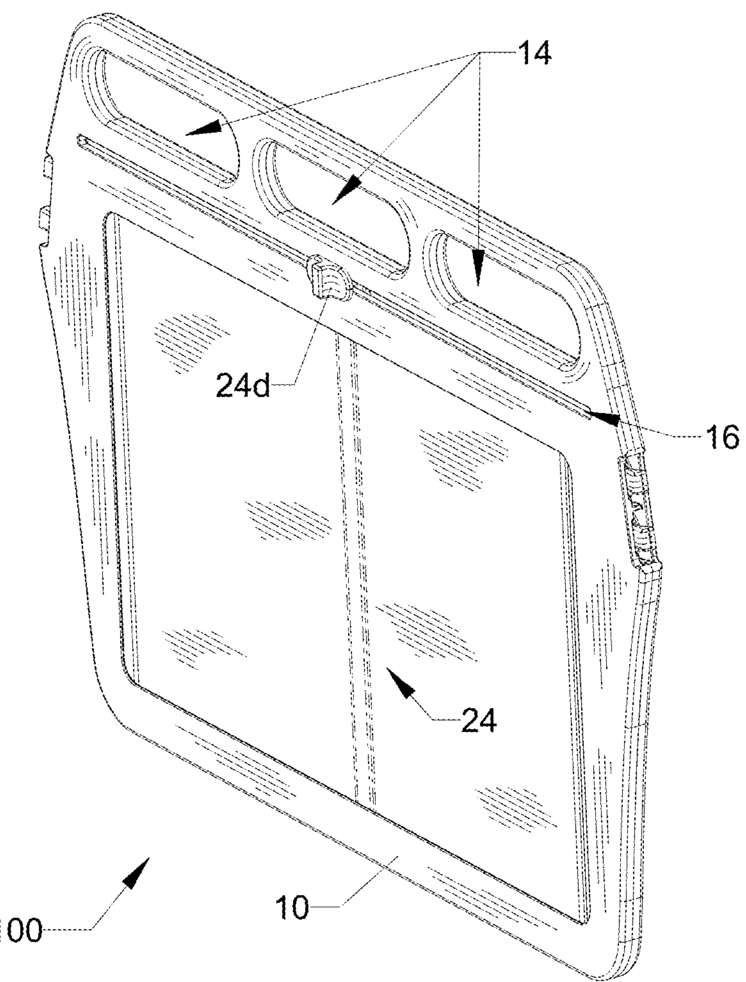
FIG. 2 is a second perspective view of the improved messaging board in FIG. 1, showing an eraser bar assembly behind a display surface in dashed line pattern.

The following is a list of reference labels used in the drawings to label components of different embodiments of the invention, and the names of the indicated components:

100 improved handheld messaging board for outdoor use or improved pit board
10 front frame
**10*a*** front opening
12 back frame
**12*a*** back frame inner facing side
**12*b*** spring
**12*c*** spring receiver of back frame
14 accessory slot
**14*a*** stopwatch
**14*b*** light module
16 eraser slot
18 display surface
**18*a*** writing panel
20 puck notch
22 puck dock or dock
24 eraser bar assembly
**24*a*** top bar
**24*b*** magnetic bar
**24*c*** first coupler
**24*d*** handle-coupler
26 writing puck
**26*a*** puck handle
**26*b*** puck body
**26*c*** magnet
28 extension pole
**28*a*** accessory slot plug
30 user

DETAILED DESCRIPTION OF THE INVENTION

An improved handheld messaging board for outdoor use according to the invention or improved pit board 100 is shown in a representative embodiment in the accompanying FIGS. 1-17. The improved pit board 100 is comprised of a front frame 10 having a front opening **10*a* and a back frame 12, with a writing panel 18*a* housed between the front and back frames 10 12, the writing panel 18*a* having a flat display surface 18 accessible through the front opening 10*a*. "Display surface" here means a flat display area of the writing panel 18*a* accessible through the front opening 10*a* of the frame assembly capable of displaying messaging information. The front and back frames 10 12** in the representative embodiment are made of 6 mm expanded PVC board commonly used for advertising and is easy to mill.

In the representative embodiment, the front and back frames 10 12 are screwed together, thereby holding the writing panel 18*a* in place and allowing for the writing panel 18*a* to be replaced, but in other embodiments, the front and back frames 10 12 are permanently glued together, with the latter embodiment having a non-replaceable display surface 18.

Figure 3:
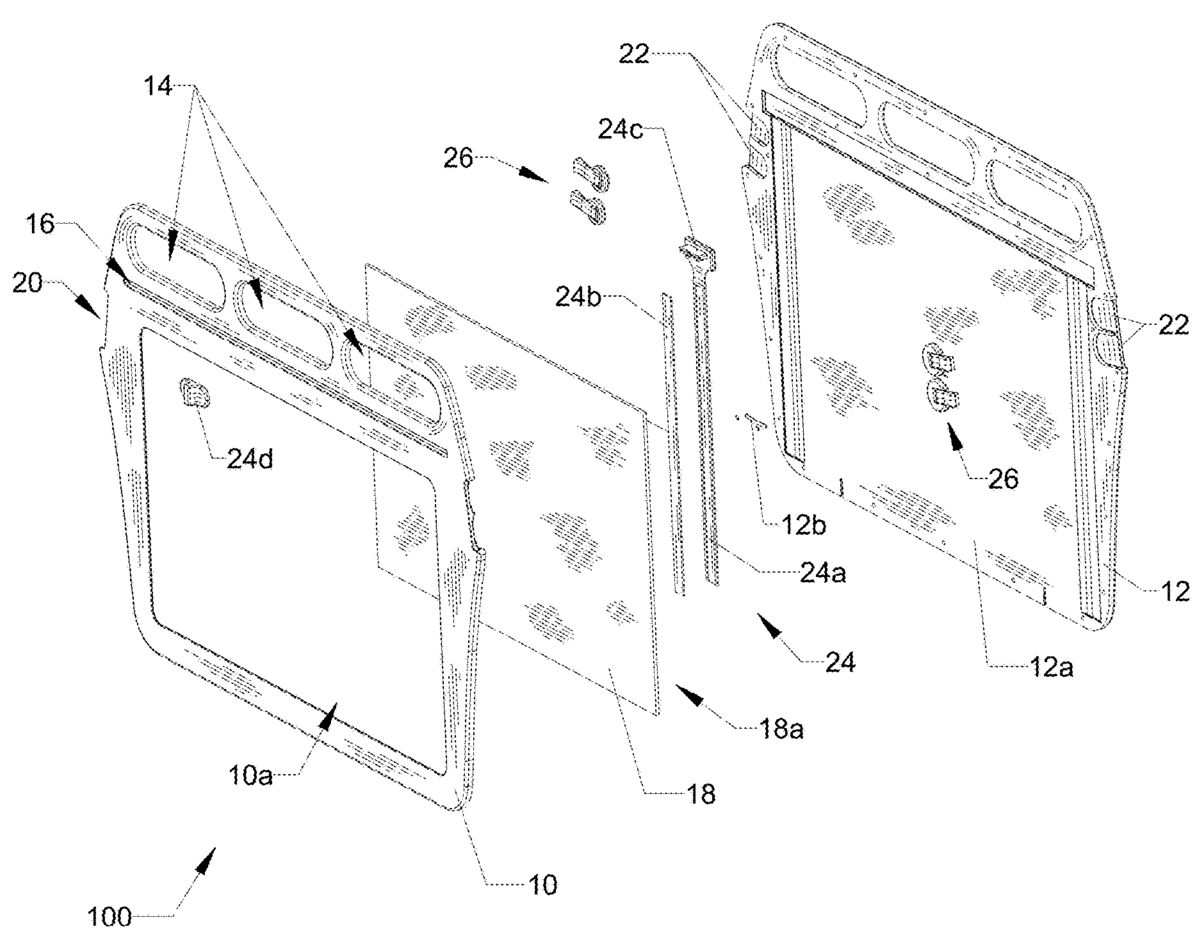
FIG. 3 is an exploded view of the improved messaging board in FIG. 1.
Figure 4:
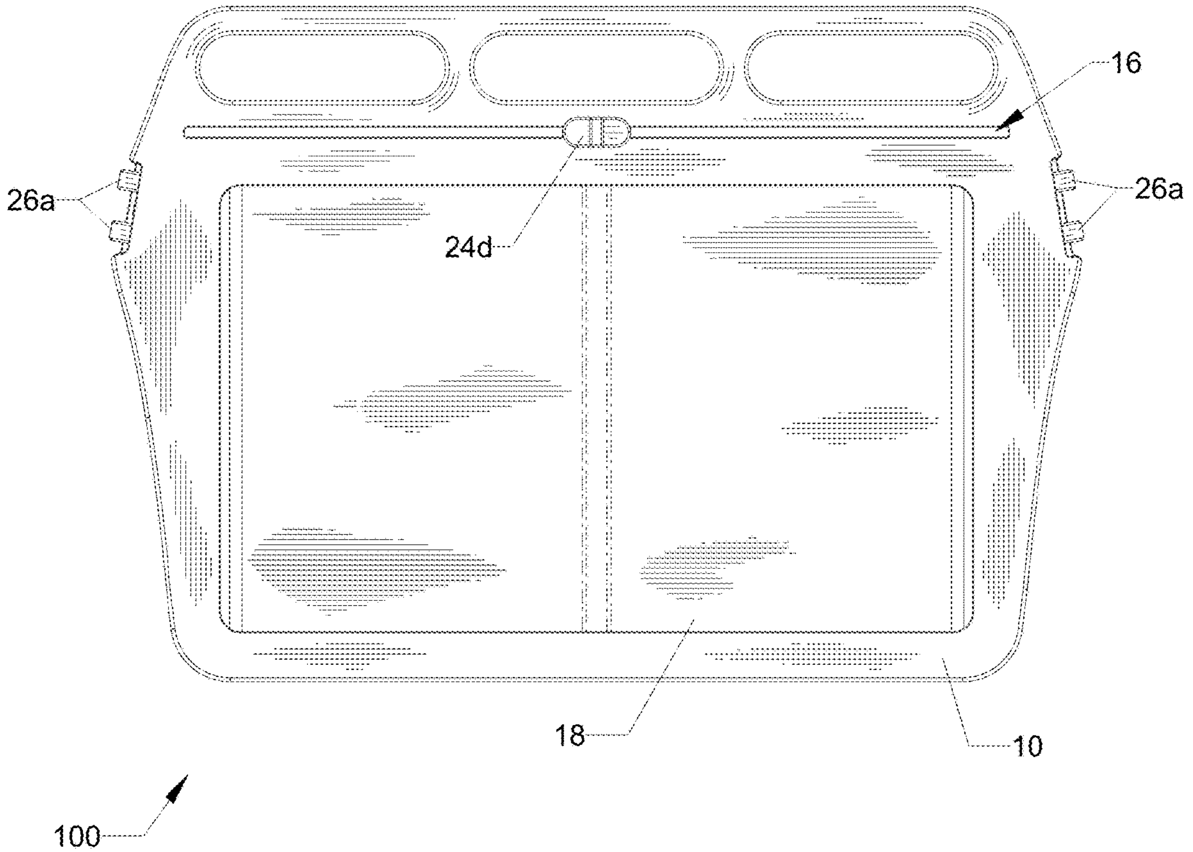
FIG. 4 is a front elevation view of the improved messaging board in FIG. 1.
Figure 5:
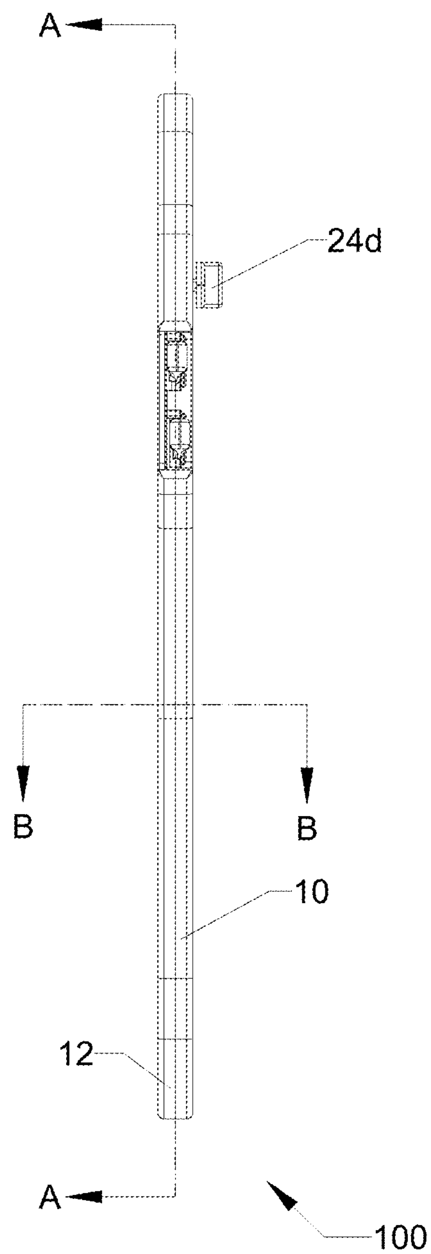
FIG. 5 is a side elevation view of the improved messaging board in FIG. 1.
Figure 6:
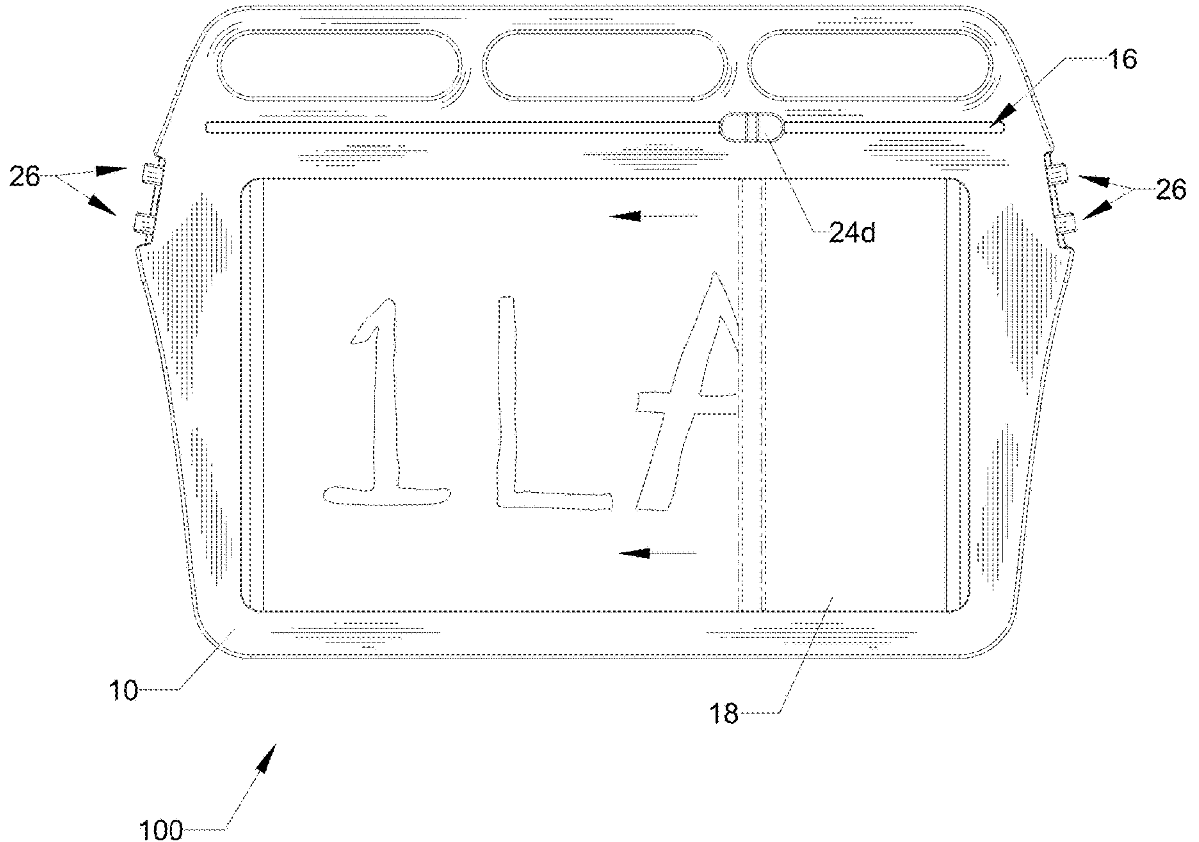
FIG. 6 is a diagrammatic representation of the improved messaging board in FIG. 1, shown with a message formed on the display surface and partially erased by the eraser bar assembly positioned behind the display surface and moving from a right side to a left side of the display surface.

The front frame 10 in the representative embodiment in FIG. 3 is further formed with a horizontally positioned eraser slot 16 positioned above the front opening 10*a* sized and shaped to slideably receive a handle-coupler 24*d* of an eraser bar assembly 24. The eraser bar assembly 24 is comprised of the handle-coupler 24*d* coupled to a first coupler 24*a* through the eraser slot 16. The first coupler 24*c* extends perpendicularly from a top end of a top bar 24*a* of the eraser bar assembly 24 with the top bar 24*a* and a magnetic bar 24*b* joined together and positioned behind the display surface 18 and behind the writing panel 18*a*, such that the magnetic bar 24*b* is immediately and slideably adjacent a back side of the writing panel 18*a*. The eraser bar assembly 24 is used to clear or magnetically "erase" messages displayed on the display surface 18, as simulated in FIG. 6. In another embodiment (not shown) the eraser slot 16 is positioned vertically to a left or right side of the writing panel 18*a* which may allow more convenient use depending on the overall size of the improved pit board 100, particularly with relatively wide boards as compared to their overall height, and in cases where the writing panel 18*a* is magnetic but forms only a portion of the overall display surface 18 which may display information such as time information received from an accessory module and thus is not an area upon which handwritten messages are written.

The display surface 18 and writing panel 18*a* in the representative embodiment in FIGS. 1 and 3 is a prior art magnetic display surface such as those used in Magna Doodle® toys, described in U.S. Pat. No. 4,143,472, titled "Displaying magnetic panel and its display device", now expired. The writing panel 18*a* is a container holding preselected quantity of iron particles suspended in liquid. The display surface 18 has been improved to increase contrast between the background of the improved pit board 100 and the message formed on the display surface 18, by using white liquid and by optimizing the preselected quantity of iron particles to create the greatest contrast between the background and the message. The increase in contrast greatly improves the functionality of the improved pit board 100 for use as an outdoor erasable sign designed to be visible over distances greater than 6 feet. The Magna Doodle® toy for instance and current magnetic writing pads are designed for close work, that is, within an arm's length of a user 30. The low contrast between the written message and the background does not hinder the functionality for its intended use, however the low contrast lacks the functionality needed for a messaging sign that requires visibility over distances and under a variety of environmental and lighting conditions.

Figure 7:
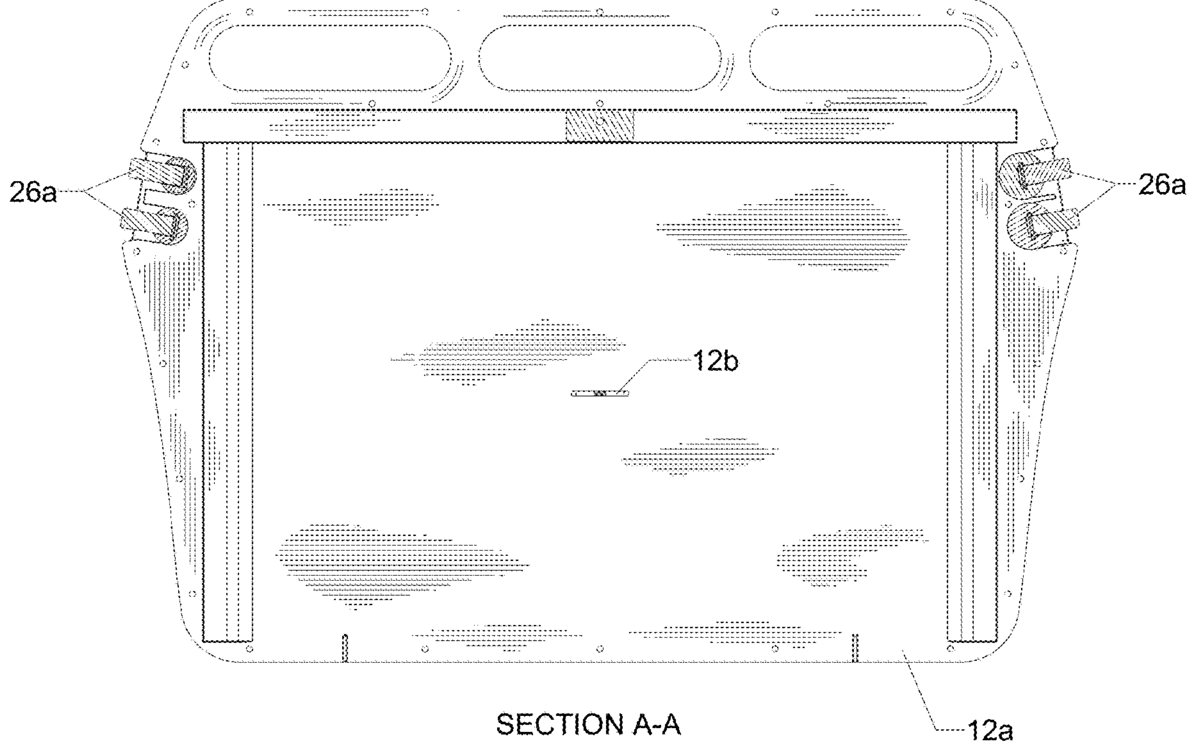
FIG. 7 is a sectional view taken along lines A-A in FIG. 5 showing an interior side of a back frame of a frame assembly of the improved messaging board.
Figure 8A:
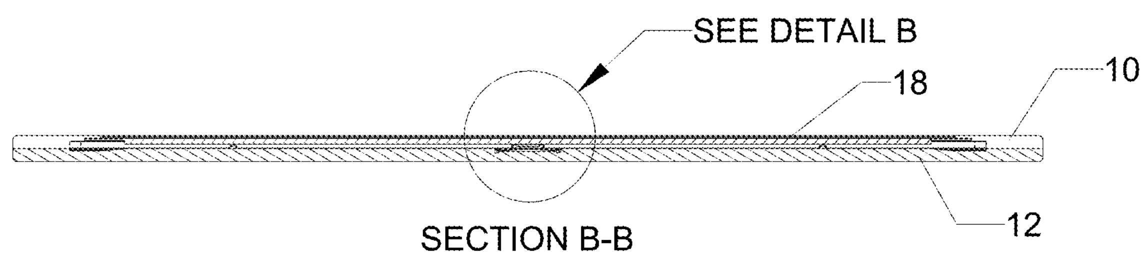
FIG. 8A is a sectional view taken along lines B-B in FIG. 5, showing the eraser bar assembly positioned over a spring of the invention, the spring positioned centrally along the interior side of the back frame.
Figure 8B:
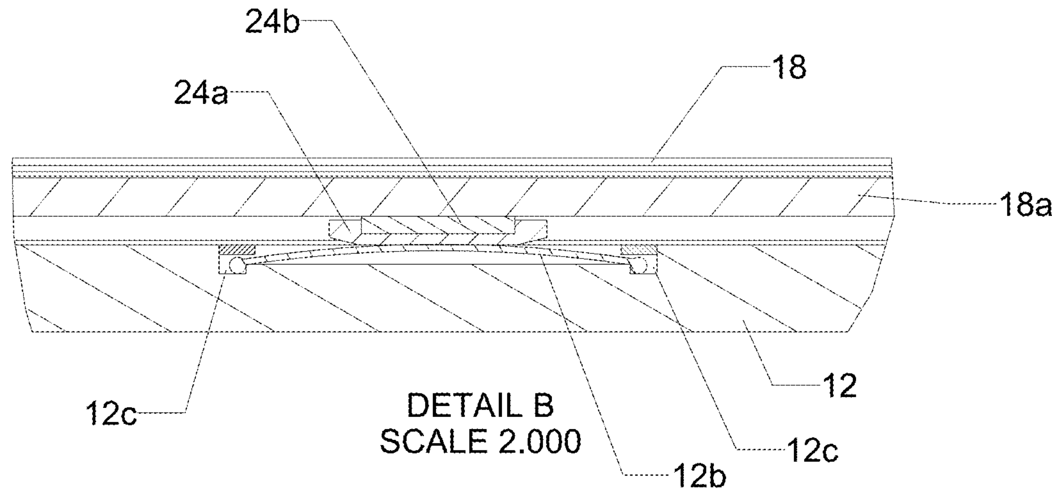
FIG. 8B is a detail view of FIG. 8A.
Figure 9:
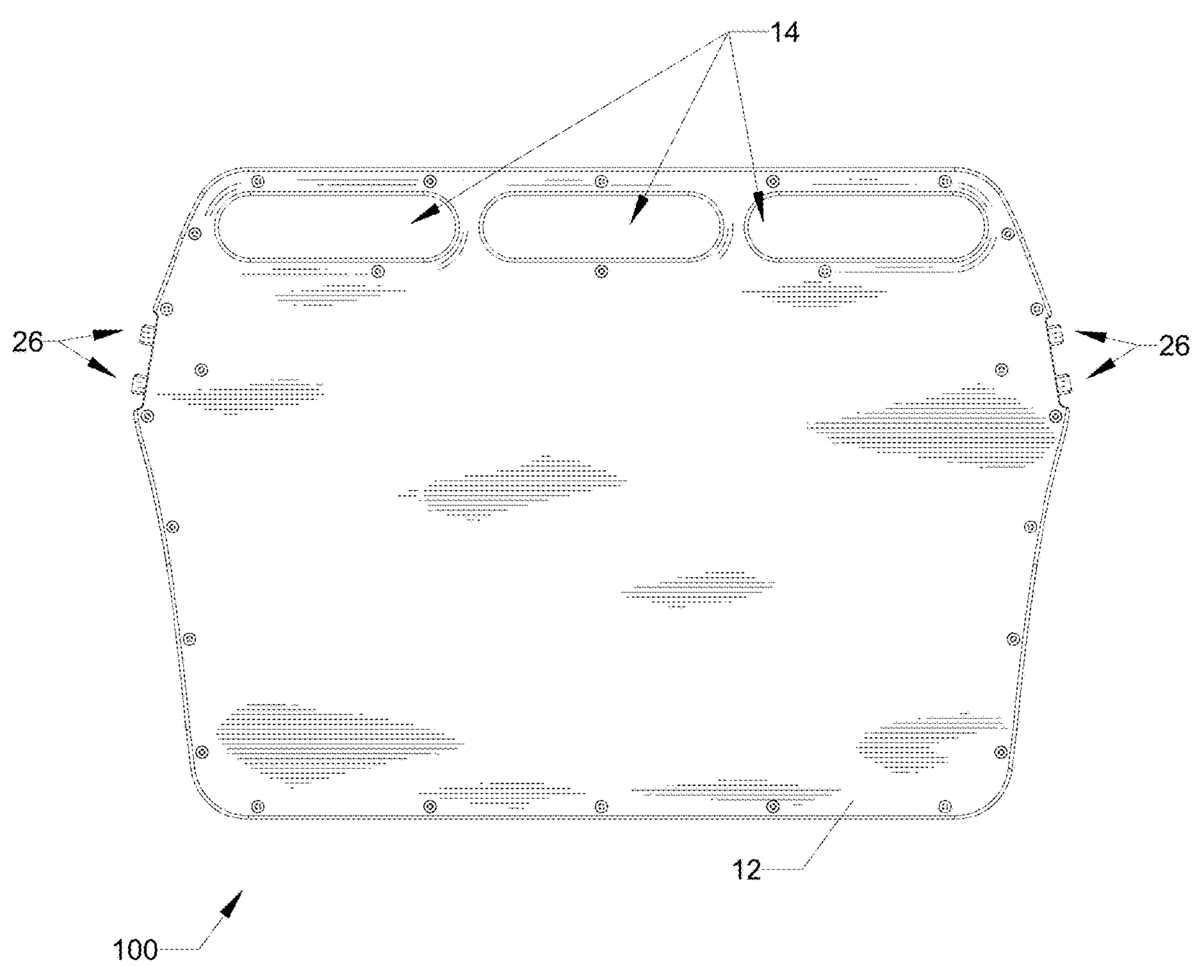
FIG. 9 is a back elevation view of the improved messaging board in FIG. 1.
Figure 10:
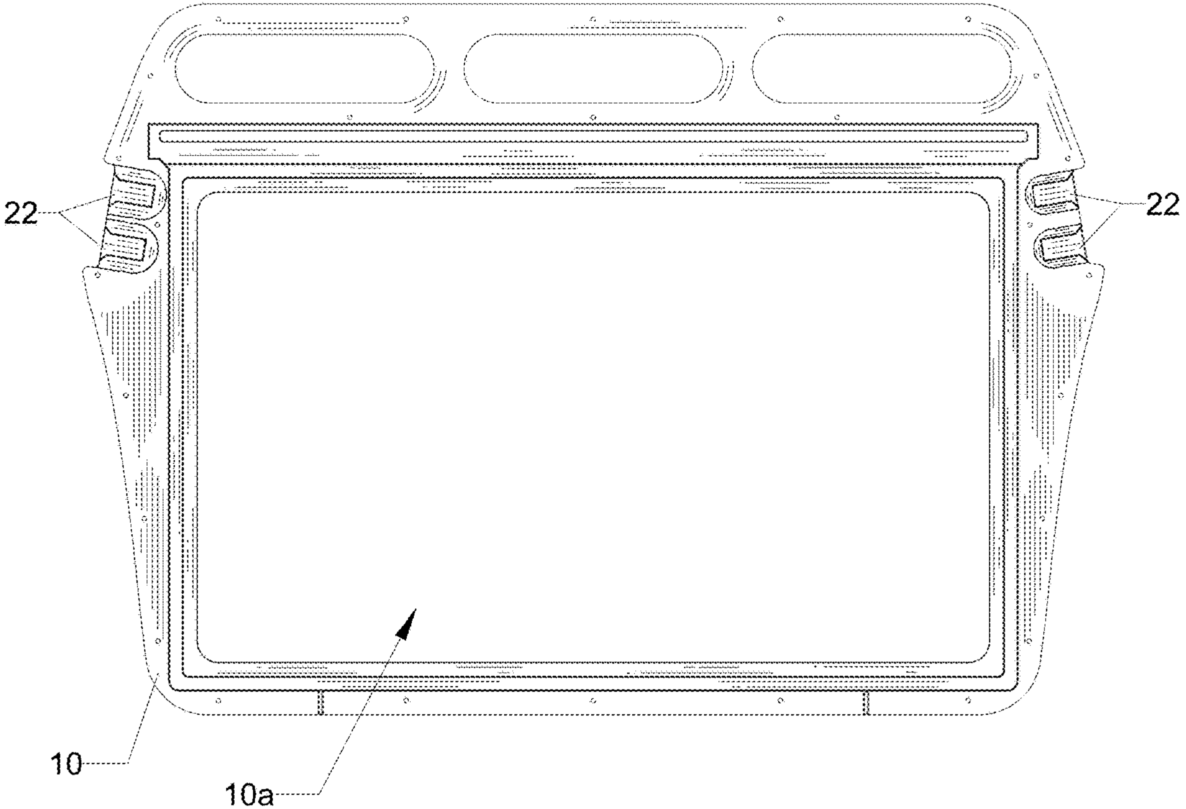
FIG. 10 is a front elevation view of an interior facing side of a front frame of the frame assembly.

The back frame 12 has an inner facing side 12*a* shown in FIG. 7, where an embodiment including a spring 12*b* shown in detail in FIGS. 8A-8B. The spring 12*b* is designed to apply pressure against the back side of the writing panel 18*a* to prevent sagging of the display surface 18. A cross sectional view of the spring 12*b* is shown in FIG. 8B, where the spring 12*b* is positioned inside a pair of spring receivers 12*c* formed into the inner facing side 12*a* of the back frame 12. The spring 12*b* is optional and is designed to support a center of the writing panel 18*a* to prevent sagging in particular when a larger writing panel 18*a* is used. The inventor notes that the spring 12*b* may be configured and positioned in a variety of ways not shown in FIGS. 3, 7 and 8B and thus the representative embodiment is meant to be illustrative and not limiting. One or more springs 12*b* may be used in a variety of locations and orientations. The type of spring shown is also not meant to be limiting and any resilient structure that can flex or compress and provide upward force against the back side of the writing panel 18*a* can be substituted for the spring shown and is included in this disclosure.

The eraser bar assembly 24 is designed to slide easily over the spring 12*b*, and any substitution of the spring shown in the representative embodiment is acceptable provided it does not hinder the slideable relationship of the eraser bar assembly 24 with the back side of the writing panel 18*a*. For instance, instead of the spring 12*b*, a piece of foam with a flat plastic portion engaging the back side of the writing panel 18*a* could allow the eraser bar assembly 24 to slide between the plastic and the back of the writing panel 18*a* and still support the writing panel 18*a* to prevent sagging.

Figure 11:
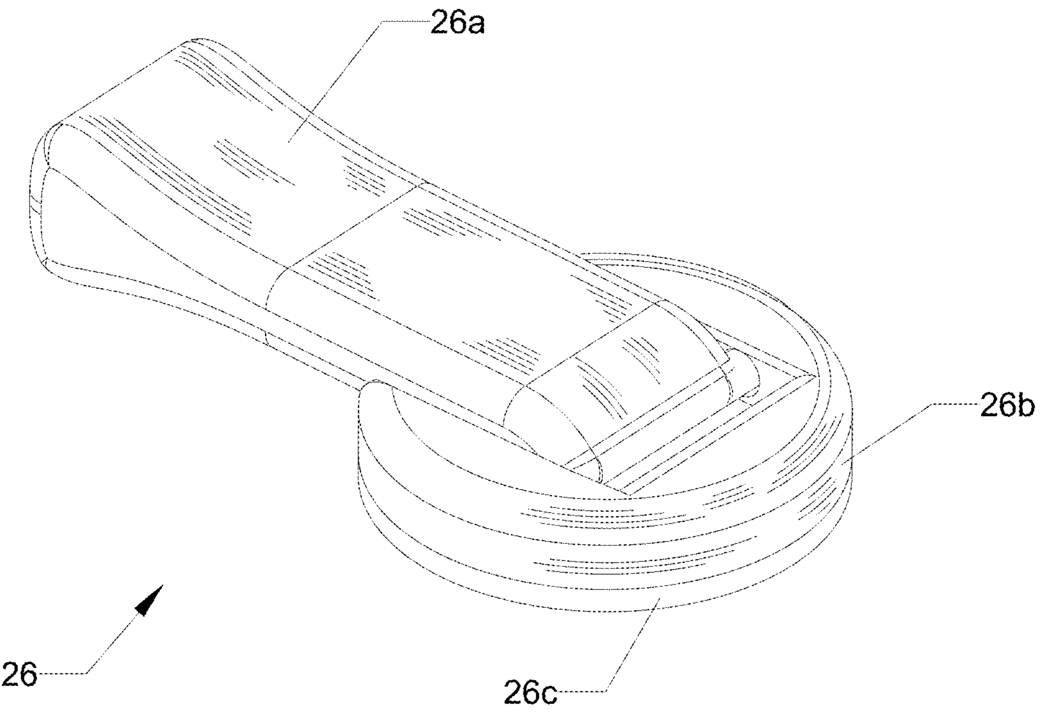
FIG. 11 a perspective view of a writing puck of the improved messaging board.
Figure 12:
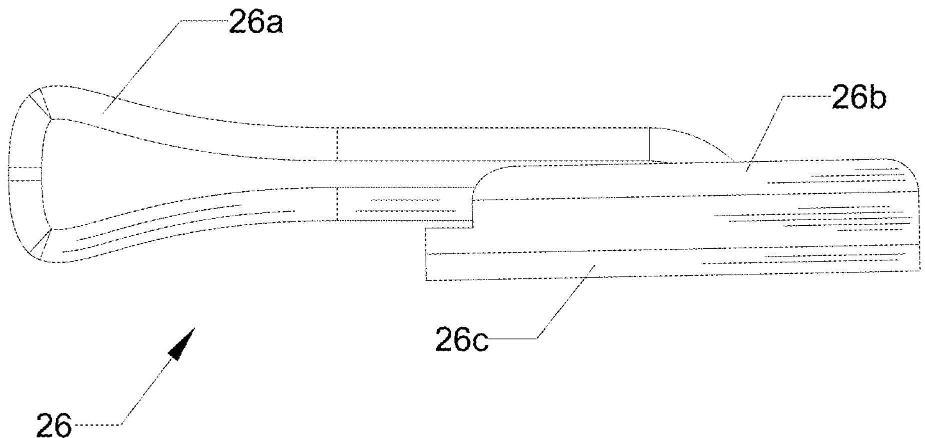
FIG. 12 is a side elevation view of the writing puck in FIG. 11.
Figure 13:
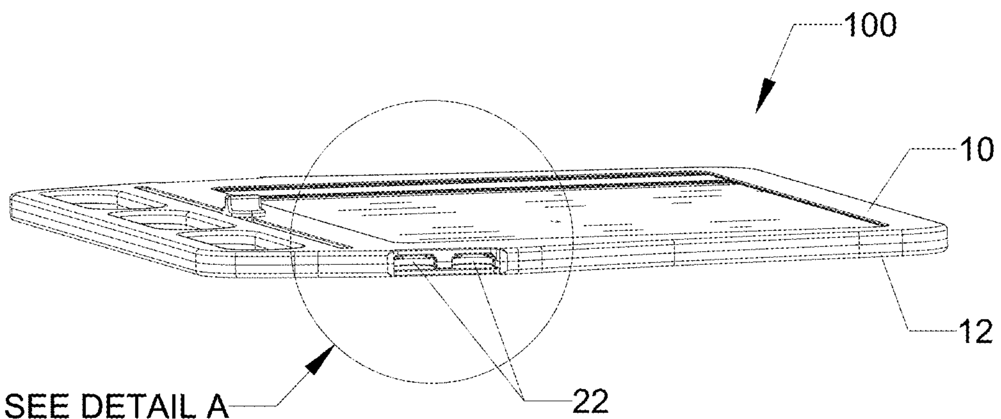
FIG. 13 is a third perspective view of the improved messaging board in FIG. 1.
Figure 14:
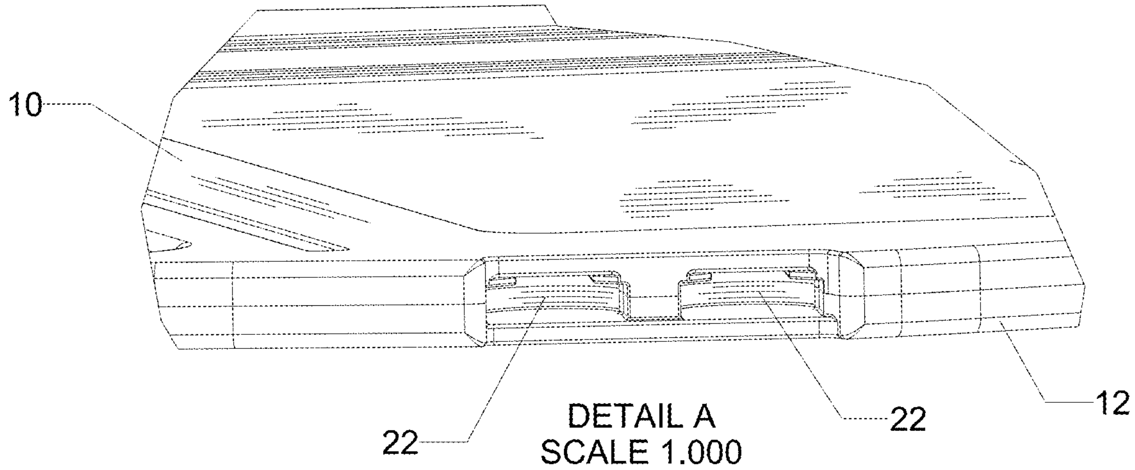
FIG. 14 is a detail view of a dock for receiving the writing puck in FIG. 11.

FIGS. 11-12 show a writing puck 26 according to the invention, having a puck body 26*b* and a puck handle 26*a*, with the puck handle 26*a* being taller relative to the puck body 26*b*. The puck 26 has a magnet 26*c* attached to a lower side of the puck body 26*b*, opposite a side to which the handle 26*a* is affixed. In use, the magnet 26*c* is positioned directly on the display surface 18 and is magnetically coupled thereto by attraction to the iron particles suspended inside the writing panel 18*a*. The writing puck 26 is designed to automatically index itself into a dock 22 formed into the front 10 and back frames 12, with the puck handle 26*a* accessible from a puck notch 20 formed in the front frame 10. The dock 22 is magnetic and ensures the writing pucks 26 are always straight when inserted, and secured in place, keeping the improved pit board 100 neat in appearance, with the writing pucks 26 conveniently stored and their handles 26*a* positioned in a repeatable, accessible location so the user 30 does not have to hunt around for the writing puck 26 each time. The dedicated dock 22 provides the user 30 "muscle memory" as to the location and orientation of the writing pucks 26, which improves user speed and efficiency. Inclusion of the dock 22 is a convenient way to securely store the writing pucks 26, however a simpler embodiment includes storing the writing pucks 26 on the display surface 18 during use or forming docks 22 into a perimeter of the opening of the front frame to position the writing pucks 26 even more closely to the display surface 18.

The puck handle 26*a* in the representative embodiment is pivotably affixed to the puck body 26*b* and is capable of pivoting approximately up to 105 degrees to allow the handles 26*a* to lie flat when stored and swivel comfortably during writing, but fixed handles at 90 degrees or less from the puck body 26*b* can also be used. In the representative embodiment shown, the writing pucks 26, including the puck body 26*b* and the handles 26*a* are all a same size but the magnets 26*c* are provided in different sizes to allow for variations in message lettering size. In the representative embodiment, the magnets are available in four sizes of 5 mm, 10 mm 15 mm and 20 mm in diameter, allowing the user 30, typically a pit crew team member, to quickly write a message with lettering in a variety of sizes as desired. The writing pucks 26 or docks 22 are marked to show magnet sizes and varying the size of the magnet 26*c* but the overall size of writing puck 26 remains the same, allowing the docks 22 and the writing pucks 26 to be a same size for ease of manufacturing and visual appeal. Unlike markers used in the prior art, where larger marker diameters are associated with larger lettering functionality, the puck handles 26*a* are uniform in size and easy to grip. The four disclosed sizes are useful sizes as determined by the inventor however the magnet size can be any size desired and the disclosed preferred sizes are not meant to limit the magnet sizes to these sizes.

Figure 15:
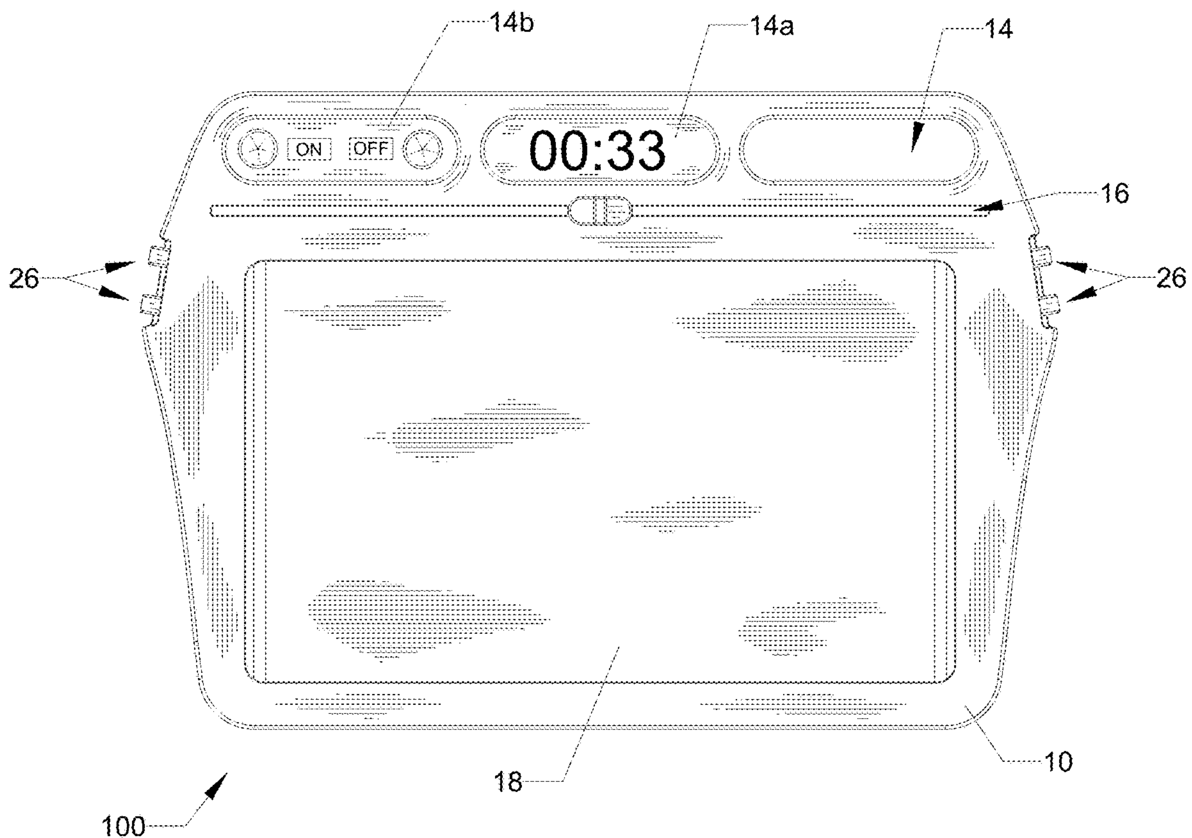
FIG. 15 is a diagrammatic representation of the improved messaging board in FIG. 1, with optional stopwatch and light accessory modules removably inserted into accessory slots.

The front and back frames 10 12 in the representative embodiment are formed with three through slots or accessory slots 14. The inventor notes that the accessory slots 14 are formed along the upper edge of the improved pit board 100 in the representative embodiment in FIGS. 1-7, 9-10, and 15-16 but could be positioned anywhere along an outermost edge of the improved pit board 100. One of the slots 14 typically is left open and serves as a traditional hand grip as shown in the representative embodiment in FIG. 15 In the prior art pit boards, two openings are formed on either side of the board and serve as left and right side hand grips but otherwise have no other function or use. In the improved pit board 100, the accessory slots 14 include an extra slot not disclosed by the prior art pit boards, and further, the accessory slots 14 are configured to receive either removable or fixed accessory modules, such as a stopwatch module 14, or a light module as shown in FIG. 15 to illustrate a few types of useful modules according to the invention. The light module 14*b* can be used to help the rider more quickly identify the rider's team pit board, provide extra light, or even to provide coded messages to the rider. For instance, a green light might indicate to the rider that the rider is in first place, and a red flashing light might more directly communicate to the rider that a pit stop is critical now. The inventor notes that in yet another embodiment, not shown, the stopwatch 14*a* or light module 14*b* can also be removably affixed to a front portion of the pit board 100 as desired, using known removable couplers such as magnets, hook and loop fasteners, clips, etc. either within the accessory slots 14 or external thereto.

The inclusion of the additional accessory slot 14 and the repurposing of the prior art hand grip slots provides the user 30 many useful options for using the improved pit board 100. For instance, other useful accessory modules that can be used in the accessory slots 14 include GPS-based telemetry units, RFID readers, environmental sensors (for instance, for temperature and humidity), wireless communication modules for receiving race data such as lap times or corner segment deltas, speakers for audio alerts such as buzzers, or haptic feedback devices. The prior art pit boards offer none of these options, which if desired, are randomly clipped to the board, or more commonly, are carried by the pit crew separate from the board. It is an object of this invention to simplify and store necessary messaging equipment, and collect and standardize messages transmitted to riders, into a single assembly and in a standardized fashion. In the representative embodiment shown in FIGS. 1-17 where the writing panel 18*a* is magnetic, the modules, removably or fixed into the accessory slots 14, allow data to be received by and transmitted from the improved pit board 100 to the rider without incorporating complicated electronics into the writing panel 18*a* itself, which would increase cost and weight of the board as well as make the improved pit board 100 potentially more fragile and prone to breakage. The representative embodiment in FIGS. 1-17 shows a simple, non-electronic erasable messaging board that efficiently stores and displays all needed equipment in a single assembly in a highly organized, ready to use fashion and allows the user 30 to provide the rider better quality information, since the user 30 can glance at the stopwatch module and write the time information on the display surface using the improved pit board 100 more efficiently than with the prior art equipment, and thus provide the rider more accurate and valuable "real time" information.

Figure 16:
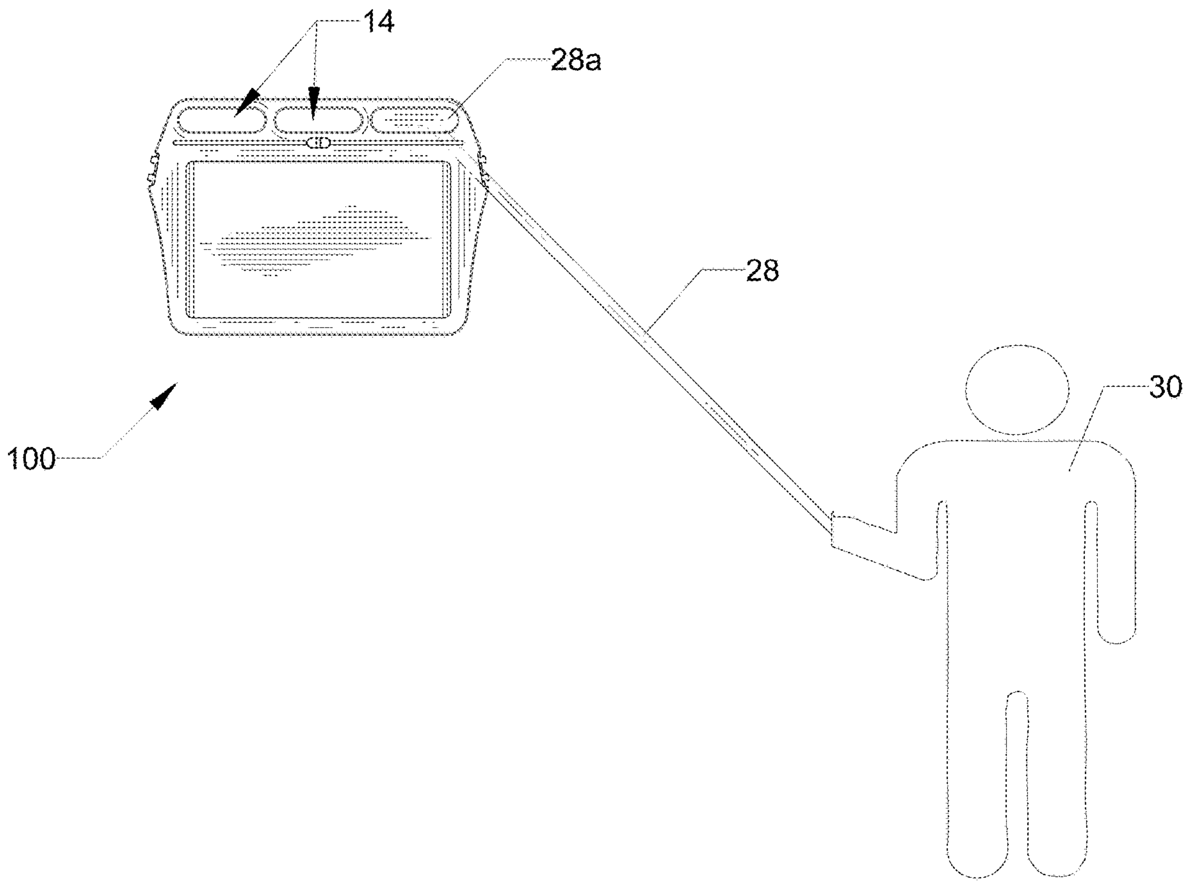
FIG. 16 is a diagrammatic representation of the improved messaging board shown used with an optional extension pole removably coupled into one of the accessory slots.
Figure 17:
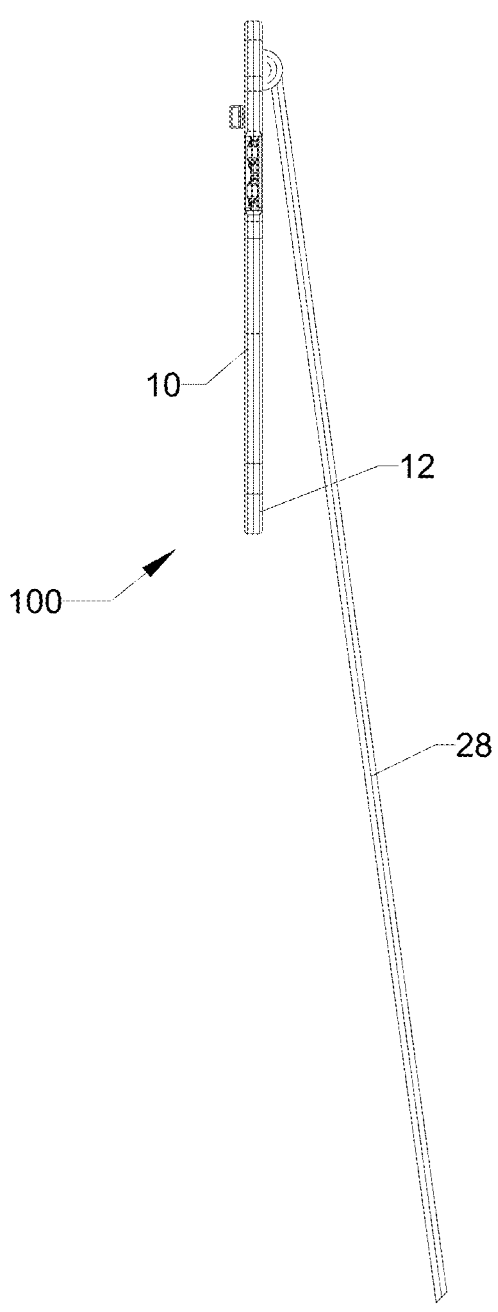
FIG. 17 is a side elevation view of the optional extension pole in FIG. 16.

FIG. 16 shows an optional extension pole 28 that allows the user 30 to thrust the improved pit board 100 into a position beyond the pit for better viewing by the rider. The extension pole 28 shown in the representative embodiment in FIGS. 16-17 has an adaptor or plug 28*a* that fits into one of the accessory slots 14, and thus could also be another accessory module, although the extension pole 28 could also removably couple to any other useful part of the frame assembly having a coupling member (not shown) formed into or on the frame assembly using known coupling means such as threaded or pressure fittings that are fixed or pivotable. The extension pole 28 in FIGS. 16-17 is shown hingeably coupled to the plug 28*a*, as shown most clearly in FIG. 17, but could be fixed or could allow limited pivoting of the improved pit board 100 relative to the extension pole 28. The extension pole can be telescoping or folding to allow adjustment of the overall length or have a fixed length.

The inventor notes that pit crews of many different teams, each holding pit boards with messages for the team's participant rider, hold their pit boards at arm's length from the user's body, so many signs are crowded together in an approximately same area near the pit crew. The extension pole 28 allows the user 30 to extend the improved pit board 100 beyond arm's length and thus improve visibility of the improved pit board 100. A shorter pit crew member, using the handle and extension pole in the representative embodiment, is no longer at a disadvantage when standing next to a taller pit crew member of a different rider's team, the unfortunate situation right now. The extension pole 28 could also be positioned in a mounting bracket (not shown) or otherwise affixed to a fence or other structure so as to hold the improved pit board 100 in a desired location but in a hands-free way, and "mounting bracket" used in this disclosure includes anything that can be used to support the extension pole 28 and improved pit board 100 other than a human hand.

The display surface 18 in the representative embodiment is magnetic by virtue of the suspended iron particles in the writing panel 18*a* but in an embodiment where the writing panel 18*a* is removably inserted into the frame assembly, an LCD, or other electronic display could be used in lieu of or used in addition to the magnetic surface, and information from the accessory modules or external to the improved pit board 100 could then be transmitted directly to the improved pit board 100 when receivers are included in the electronic display/electronic writing panel, providing the rider real time information that the user 30 does not need to check and then write on the improved pit board 100. Thus, the improved pit board 100 may integrate with external systems that transmit real-time data via onboard modules or electronic displays, including for example GPS-based telemetry, RFID timing gates, Bluetooth or RF lap timers, UWB-based corner timing systems, mobile app interfaces, or track-sided data transmitters.

Note that the display surface 18 as defined by this disclosure is a surface accessible through the front opening 10*a* of the frame assembly that can display messaging information, and thus a single display surface 18 can display information from one or more writing panels 18*a* housed directly behind the display surface 18, for instance, a magnetic writing panel 18*a* adjacent an LCD writing panel 18*a* receiving and displaying timing information from the stopwatch 14*a*, allowing the user to write messages and also display real time information to the rider. Suitable writing panels 18*a* include LCD, LED, ePaper, and the display screen 18 may be an electronic screen that is part of the electronic writing panel, or separate therefrom, including but not limited to capacitive, resistive, and infrared touch screens. For embodiments including more than one type of writing panel, the display surface 18 may be the individual uppermost display screens of the writing panels so as to create multiple display surfaces 18. The writing panel 18*a* can also include different combinations of magnetic and/or electronic components and thus "writing panel" in this disclosure is inclusive of one or more writing panels housed in a same frame assembly that can temporarily display information.

If the writing panel is electronic, necessary components including a controller, wiring and power are also included as are any receivers and transmitters if the writing panel and its display screen are to display information wirelessly from other sources, including from one or more accessory modules. The receivers and/or transmitters may also be part of the accessory modules that then communicate with the information to the writing panel to display the information. A controller is needed to allow the user the ability to control what information is displayed, for how long, and in what order. Again, the inventor is repurposing existing equipment for a new use that does not exist, and it is well known in the art as to how to create electronic screens that can receive/transmit wireless information and display said information in a controlled manner. Incorporating existing technology can also allow the user 30 to talk to the writing panel and the speech converts to visible words displayed on the display screen 18. The novelty here is the use of this technology as an erasable sign used outdoors under challenging outdoor conditions. Electronic screens are used outdoors, but typically for close work, and large electronic signs that are replacing billboards are not designed to be handheld or mobile at all.

For the embodiment where the writing panel 18*a* is removable, one or more writing panels 18*a* are positioned inside the frame assembly using one or more known methods, including magnets, friction-fit tabs, snap-fit clips, edge rails or grooves, hook-and-loop fasteners, or slide-in channels. The inner facing side 12*a* of the back frame 12 may also include partitions for convenient "drop in" writing panel modules to simplify replacement. Incorporation of two or more writing panels 18*a* with a single display surface 18 can improve real time communication of information to the rider by the pit crew by eliminating the need for the user to write the information on the display surface 18 and simply have the panel 18*a* display the information, but also increases complexity of the improved pit board 100 and the inventor notes that the different embodiments with one or more writing panels 18*a*, permanently or removably housed in the frame assembly, are meant to balance function and need with cost and other commercial considerations. In some embodiments, areas designed for hand written messages will be separate from those where information is automatically received and displayed, while in others there is a single display surface 18 without any visible separations on the display surface.

The improved pit board 100 can be available as a kit with various accessory modules for use in the accessory slots 14 for the representative embodiment in FIGS. 1-17 and when the writing panel 18*a* is not removable. For the embodiment with the removable writing panel 18*a*, the kit may include different types of writing panels 18*a* and modules housed in the frame assembly accessible through the front opening 10. In such embodiments, the eraser slot 16 may be incorporated into a magnetic writing panel module and eliminated from the front frame 10, where the eraser bar assembly 24 is sized and positioned to only slide along the magnetic writing panel itself, and be eliminated where the writing panel module positioned in the frame assembly lacks magnetic properties.

To use the improved pit board 100 in the representative embodiment during a motocross race as a messaging board, the user 30 selects a writing puck 26 based on a desired lettering size, removes it from the dock 22, positions the magnet 26*c* of the writing puck 26 on the display surface 18, and slides the writing puck 26 along the display surface 18, forming a message to be displayed to the rider. Once the message is complete, the user 30 can leave the writing puck on the display surface 18 or reposition it into the dock 22. The user 30 then either grabs an open accessory slot 14 or the extension pole 28 pre-attached to the improved pit board 100 and then displays the display surface 18 of the improved pit board 100 towards the rider. The extension pole 28, if used, can be attached to the improved pit board 100 at any time, including prior to forming the message as well as immediately before displaying the message to the rider. Once the message has been displayed to the rider, the user 30 slides the eraser bar assembly 24 behind the display surface 18, removing the message and keeping it relatively private from pit crew members of other teams. The display surface 18 is now ready to receive a new message. At any time during use, accessory modules such as the stopwatch can be inserted into or removed from the accessory slots 14. When the race is over, the writing pucks 26 are all returned to the docks 22 and optionally the accessory modules are removed.

The improved pit board 100 provides many advantages over the prior art pit boards in current use. Prior art pit boards are thin, single boards that when damaged are thrown away and replaced, but since these boards are often customized with a rider's colors, number, sponsor, etc. regular replacement of the prior art pit boards is an expensive, recurring cost. The inventor's improved pit board 100 is thicker and more durable, and the large, smooth writing pucks 26 limit damage to the display surface 18 even in dusty conditions, as there is no pointy tip that could accidentally puncture the display surface 18, or collect dust, and the round pucks push dust and dirt along the display surface 18 rather than grinding it into the surface as is the tendency with the prior art marker tips. As the writing pucks 26 are stored within the dock 22, there is also no need to carry a variety of markers and other things that might also damage the display surface 18 or get lost or dropped in the pit during use.

While the improved pit board 100 is more substantial than some of the prior art pit boards, the representative embodiment shown in FIGS. 1-17 is still approximately 3 oz lighter than a popular prior art pit board currently available on the market. The improved pit board 100 as shown in the representative embodiment with the magnetic writing panel 18*a* is impervious to rain, mud, and outdoor conditions, needs no power source, and is lightweight and durable. In embodiments offering different writing puck 26 sizes, the user 30 has the option to quickly write messages with varying lettering sizing. This is currently not possible with the prior art dry erase markers as tip size is limited by the available size of the marker and wider markers are difficult to hold, more expensive to manufacture and purchase, and the user 30 is now either forced to carry a variety of markers to vary the lettering size or more likely, just draw and color in larger letters, a process that is time consuming.

The prior art pit board is designed to allow the pit crew to communicate valuable information to the rider and the inventor's improved pit board 100 is designed specifically to provide messages and also simplify and consolidate equipment needed for communication purposes, such as by integrating magnetic writing implements into the board for secure storage, improve the quality of the information provided to the rider by reducing the time it takes to provide such information, as well as by standardizing the location such information is displayed and equipment is stored. For instance, time information is valuable to riders, and pit crews currently carry stopwatches. To communicate time information to the rider, the pit crews must first consult with the separately carried stopwatch, then write the time information on the prior art pit board. The problem with this method, however, is that the time information to the rider is not "in real time" when the rider sees it, and thus is just an approximation for the rider, plus the pit crew must handle the stopwatch then the board separately. In FIG. 15, the optional stopwatch **14*a*** module consolidates and simplifies the pit crew's job by allowing the rider to look at the sign message and automatically see the stopwatch information in real time, or to simply allow the pit crew faster access to the time information to then write onto the board without the need to separately handle the stopwatch.

It is to be understood that the above-described arrangements are only illustrative of the application of the principles of the present invention. Numerous modifications and alternative arrangements may be devised by those skilled in the art without departing from the scope of the present invention. One significant advantage of the improved pit board 100 is that it allows the pit crew to quickly write messages when needed, rather than the current practice of prewriting messages and then trying to keep them hidden from other pit crew members of different teams. Many crew members try to keep their boards private but a prewritten message on a dry erase board using a dry erase marker can be easily damaged as the crew member tries to keep the message hidden. Prewritten messages allow pit crew members to create fancier messages as well, which overcome the issues of marker tip size by allowing the crew member more time to craft the prewritten message. Messages often have valuable information that teams prefer not to give the other riders, and the ability to quickly write a message then erase it provides the rider and his or her team a tactical advantage over other competitors. In embodiments where the writing panel **18*a*** is in fact an LCD or other electronic screen, it is possible to create and save electronic messages to be displayed at a later time, truly eliminating the need for extra boards and equipment while allowing the user to preplan messages and even the order of the messages to display. Such functionality does not exist with the prior art boards and it is common to see pit crews holding, shielding, and shuffling through multiple prewritten boards all while trying to not damage the message, then quickly hiding or erasing the used messaged to keep them secret from other pit crews.

Other significant advantages of the improved pit board 100 include that the magnetic writing pucks 26 do not fall off the improved pit board 100 and the docks 22 ensure all necessary parts are integrated and easily retrieved, used, and stored. Current pit boards require the users to stash the markers in their pockets or snap them onto physical holders on the board, where they can be easily dropped, dislodged, or lost. The writing pucks 26 never require replacement either, unlike markers that eventually need to be replaced, as well as rags or dry erasers that must be periodically cleaned to remove marker build up on their cleaning surfaces. The rags and dry erasers themselves are messy as they release powdered marker debris, and thus the user's pockets and bags also get filled with marker particulate. The improved pit board 100 is clean and fuss free.

The inventor also believes his improved pit board 100 and its accessories can be used at all spectator sport games and in a variety of different settings beyond use by the pit crew. For supporters on the sidelines of a soccer game, a grandparent in a wheelchair can still provide messages to a grandchild without physically having to having to try to physically maneuver and compete with more ambulatory people on the sidelines.

I claim:

1. An improved handheld messaging board for outdoor use, comprising:

a writing panel disposed as a container with a flat display surface, the writing panel containing a predetermined quantity of iron particles suspended in a white liquid;

a frame assembly having a front frame with an opening positioned over the writing panel such that the upper writing surface is accessible through the opening and a back frame;

a writing puck having a flat writing portion with a magnet of a predetermined diameter adapted to slideably engage the display surface and an opposed handle portion;

an elongated through-slot adjacent the opening in the front frame;

an eraser bar assembly slideably engaging the elongated through-slot, the eraser bar assembly having a magnetic bar positioned behind the writing panel inside the frame assembly; and a first accessory slot and a second accessory slot formed into the frame assembly adapted to receive either a human hand or an accessory module;

wherein the handle portion of the writing puck is hingeably affixed to the flat writing portion and pivotable at least 90 degrees.

2. An improved handheld messaging board comprising a writing panel disposed as a container with a flat display surface, the writing panel containing a predetermined quantity of iron particles suspended in a white liquid;

a frame assembly having a front frame with an opening positioned over the writing panel such that the upper writing surface is accessible through the opening and a back frame;

a writing puck having a flat writing portion with a magnet of a predetermined diameter adapted to slideably engage the display surface and an opposed handle portion;

an elongated through-slot adjacent the opening in the front frame;

an eraser bar assembly slideably engaging the elongated through-slot, the eraser bar assembly having a magnetic bar positioned behind the writing panel inside the frame assembly;

a first accessory slot and a second accessory slot formed into the frame assembly adapted to receive either a human hand or an accessory module; and a dock disposed as a slot formed into frame assembly sized and shaped to magnetically mate with the writing puck such that the handle portion is parallel to the flat writing portion.

3. The improved handheld messaging board in claim 2, wherein the dock is formed along an outermost edge of the frame assembly.

4. An improved handheld messaging board for outdoor use, comprising:

a writing panel disposed as a container with a flat display surface, the writing panel containing a predetermined quantity of iron particles suspended in a white liquid;

a frame assembly having a front frame with an opening positioned over the writing panel such that the upper writing surface is accessible through the opening and a back frame;

a writing puck having a flat writing portion with a magnet of a predetermined diameter adapted to slideably engage the display surface and an opposed handle portion;

an elongated through-slot adjacent the opening in the front frame;

an eraser bar assembly slideably engaging the elongated through-slot, the eraser bar assembly having a magnetic bar positioned behind the writing panel inside the frame assembly;

a first accessory slot and a second accessory slot formed into the frame assembly adapted to receive either a human hand or an accessory module; and an extension pole having a frame coupler at one end and a handle at an opposed end, the frame coupler adapted to couple to the frame assembly and the handle adapted to be held by a human hand or within a mounting bracket.

5. The improved handheld messaging board in claim 4, wherein the extension pole is removably coupled to either the first or second accessory slot.

* * * * *